(12) United States Patent
Hu et al.

(10) Patent No.: US 11,218,417 B2
(45) Date of Patent: Jan. 4, 2022

(54) DATA SCHEDULING METHOD AND SWITCHING DEVICE

(71) Applicant: HUAWEI TECHNOLOGIES CO., LTD., Guangdong (CN)

(72) Inventors: Nongda Hu, Beijing (CN); Zheng Cao, Shenzhen (CN); Xiaoli Liu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/875,215

(22) Filed: May 15, 2020

(65) Prior Publication Data

US 2020/0280523 A1 Sep. 3, 2020

Related U.S. Application Data

(63) Continuation of application No. PCT/CN2018/115887, filed on Nov. 16, 2018.

(30) Foreign Application Priority Data

Nov. 16, 2017 (CN) .......................... 201711137256.7

(51) Int. Cl.
*H04L 12/863* (2013.01)
*H04L 12/935* (2013.01)

(52) U.S. Cl.
CPC ...... *H04L 47/6295* (2013.01); *H04L 49/3018* (2013.01)

(58) Field of Classification Search
None
See application file for complete search history.

(56) References Cited

U.S. PATENT DOCUMENTS

| 5,226,041 A * | 7/1993 | Waclawsky ............. H04L 43/00 370/236 |
| 6,799,200 B1 * | 9/2004 | Blackmore ......... G06F 12/1081 709/212 |

(Continued)

FOREIGN PATENT DOCUMENTS

| CN | 102088412 A | 6/2011 |
| CN | 103546392 A | 1/2014 |
| CN | 106921586 A | 7/2017 |

OTHER PUBLICATIONS

PCT International Search Report and Written Opinion issued in International Application No. PCT/CN2018/115887 dated Feb. 20, 2019, 15 pages (with English translation).

(Continued)

*Primary Examiner* — Alex Skripnikov
(74) *Attorney, Agent, or Firm* — Fish & Richardson P.C.

(57) ABSTRACT

Embodiments of this application provide a method, includes: receiving a first data flow that includes a plurality of data units; inputting $N_1$ data units of the plurality of data units and a first source marking unit into the first source queue; inputting $M_1$ data units of the plurality of data units and a first target marking unit into the first target queue, wherein the $N_1$ data units and the $M_1$ data units are different data units; scheduling the $N_1$ data units and the first source marking unit based on the first source marking unit and the first target marking unit; and scheduling the first target marking unit and the $M_1$ data units, wherein the first target marking unit and the $M_1$ data units are scheduled later than the $N_1$ data units and the first source marking unit are scheduled.

17 Claims, 3 Drawing Sheets

(56) References Cited

U.S. PATENT DOCUMENTS

| | | | |
|---|---|---|---|
| 2002/0089927 A1* | 7/2002 | Fischer | H04W 28/02 370/229 |
| 2006/0262720 A1 | 11/2006 | Charny et al. | |
| 2009/0213732 A1 | 8/2009 | Veal et al. | |
| 2011/0131189 A1 | 6/2011 | Mangano et al. | |
| 2014/0146831 A1 | 5/2014 | Xu | |
| 2014/0233383 A1 | 8/2014 | Naaman et al. | |

OTHER PUBLICATIONS

Extended European Search Report issued in European Application No. 18879244.4 dated Oct. 9, 2020, 13 pages.
Office Action issued in Chinese Application No. 201711137256.7 dated May 21, 2021, 12 pages (with English translation).

* cited by examiner

DATA SCHEDULING METHOD AND SWITCHING DEVICE

CROSS-REFERENCE TO RELATED APPLICATIONS

This application is a continuation of International Application No. PCT/CN2018/115887, filed on Nov. 16, 2018, which claims priority to Chinese Patent Application No. 201711137256.7, filed on Nov. 16, 2017. The disclosures of the aforementioned applications are hereby incorporated by reference in their entireties.

TECHNICAL FIELD

This application relates to the field of information technologies, and more specifically, to a data scheduling method and a switching device.

BACKGROUND

A switching device (for example, a switch and a router) may generally include a plurality of queues. In a data flow receiving process, the switching device may switch a queue for receiving the data flow.

For example, the switching device may select, based on a size of a received data flow, a queue that the data flow needs to be input. However, in some cases, when starting to receive a data flow, the switching device may identify the data flow as a mice flow. In this case, the data flow may be input into a queue corresponding to the mice flow. However, as a quantity of bytes of the data flow that are received by the switching device exceeds a preset threshold, the switching device may identify the data flow as an elephant flow. In this case, the switching device may switch the queue for receiving the data flow from a queue corresponding to the mice flow to a queue corresponding to the elephant flow.

For another example, the switching device may select, based on whether a received data flow is a data flow causing congestion, a queue that the data flow needs to be input. However, in some cases, when starting to receive a data flow, the switching device may determine the data flow as a non-congestion data flow. Therefore, the data flow is input into a queue corresponding to the non-congestion data flow. However, when congestion occurs, after the switching device identifies the data flow as a congestion data flow, the switching device may switch a queue for receiving the data flow from a queue corresponding to the non-congestion data flow to a queue corresponding to the congestion data flow.

Although the queue corresponding to the data flow is switched, when the switching device outputs a data unit in the data flow, an output sequence of a data unit that is output from the switching device needs to be consistent with an input sequence of the data unit. For example, when receiving a data flow, the switching device sequentially receives a data unit 1 to a data unit 7. A sequence of outputting data units from the switching device also needs to be: the data unit 1 to the data unit 7.

Currently, to ensure that an output sequence of a data unit is consistent with an input sequence of the data unit, in a feasible technical solution, a data unit that is input into a queue before switching is moved to a switched queue. For example, a data unit 1 to a data unit 6 have been input into a queue (hereinafter referred to as a source queue) before data flow switching. After the data flow is switched from the queue to another queue (hereinafter referred to as a target queue), the data unit 1 to the data unit 6 need to be first moved from the source queue to the target queue, and then the data unit 7 is input into the target queue. In this technical solution, the switching device needs to traverse the access source queue to determine a data unit that needs to be moved. This may cause very large access overheads, thereby seriously affecting normally processing a data flow by the switching device. In addition, to simplify a queue operation, a queue usually supports only a first in first out scheduling manner. However, random access needs to be supported in moving a data packet. This may greatly increase queue management complexity.

Therefore, a simple method for avoiding data flow disorder is required.

SUMMARY

Embodiments of this application provide a data scheduling method and a switching device, so as to avoid data flow disorder.

According to a first aspect, an embodiment of this application provides a data scheduling method, where the method includes: receiving $N_1$ data units from a first data flow, where the data unit is a data packet or a descriptor of a data packet, and $N_1$ is a positive integer greater than or equal to 1; inputting the $N_1$ data units into a first source queue; determining that the first data flow is switched from the first source queue to a first target queue, where the first source queue and the first target queue belong to a first queue pair; inputting a first source marking unit into the first source queue, and inputting a first target marking unit into the first target queue; receiving $M_1$ data units from the first data flow, where $M_1$ is a positive integer greater than or equal to 1; inputting the $M_1$ data units into the first target queue; and scheduling the $N_1$ data units and the first source marking unit from the first source queue based on the first source marking unit and the first target marking unit, and scheduling the first target marking unit and the $M_1$ data units from the first target queue, where a moment at which the first source marking unit is scheduled from the first source queue is earlier than a moment at which the first target scheduling unit is scheduled from the first target queue. In the foregoing technical solution, an input sequence of the N data units may be the same as an output sequence of the M data units provided that a source marking unit and a target marking unit are respectively input into a source queue and a target queue. Therefore, in the foregoing technical solution, a data unit does not need to be switched from one queue to another queue. Consequently, complexity of queue management in the foregoing technical solution is relatively low. In addition, in the foregoing technical solution, there is no need to select some data units from one queue, and the switching device does not need to support random access. Therefore, this technical solution provides a simple and convenient method for avoiding data flow disorder.

With reference to the first aspect, in a first possible implementation of the first aspect, the scheduling the $N_1$ data units and the first source marking unit from the first source queue based on the first source marking unit and the first target marking unit, and scheduling the first target marking unit and the $M_1$ data units from the first target queue includes: scheduling the $N_1$ data units and the first source marking unit from the first source queue based on the first source marking unit and the first target marking unit, and after the first source marking unit is scheduled from the first source queue, scheduling the first target marking unit and the $M_1$ data units from the first target queue.

With reference to the first possible implementation of the first aspect, in a second possible implementation of the first aspect, the scheduling the $N_1$ data units and the first source marking unit from the first source queue based on the first source marking unit and the first target marking unit, and after the first source marking unit is scheduled from the first source queue, scheduling the first target marking unit and the $M_1$ data units from the first target queue includes: determining whether a first to-be-scheduled unit is the first source marking unit, where the first to-be-scheduled unit is a first to-be-scheduled unit in the source queue; determining whether a second to-be-scheduled unit is the first target marking unit, where the second to-be-scheduled unit is a first to-be-scheduled unit in the target queue; when the first to-be-scheduled unit is not the first source marking unit and the second to-be-scheduled unit is not the first target marking unit, scheduling the first to-be-scheduled unit and the second to-be-scheduled unit according to a preset rule, and continuing to determine whether a third to-be-scheduled unit is the first source marking unit, and determining whether a fourth to-be-scheduled unit is the first target marking unit, where the third to-be-scheduled unit is a first to-be-scheduled unit in the first source queue after the first to-be-scheduled unit is scheduled from the first source queue, and the fourth to-be-scheduled unit is a first to-be-scheduled unit in the first target queue after the second to-be-scheduled unit is scheduled from the first target queue; when the first to-be-scheduled unit is not the first source marking unit and the second to-be-scheduled unit is the first target marking unit, scheduling the first to-be-scheduled unit from the source queue, and continuing to determine whether the third to-be-scheduled unit is the first source marking unit; or when the first to-be-scheduled unit is the first source marking unit and the second to-be-scheduled unit is the first target marking unit, scheduling the first source marking unit from the first source queue, and after the first source marking unit is scheduled from the first source queue, scheduling the first target marking unit from the first target queue.

With reference to the first possible implementation of the first aspect or the second possible implementation of the first aspect, in a third possible implementation of the first aspect, the method further includes: when the first source marking unit is input into the first source queue, increasing a value of a first source counter in a first counter pair by 1; when the first target marking is input into the first target queue, increasing a value of a first target counter in the first counter pair by 1, where the first counter pair is corresponding to the first queue pair, the first source counter is corresponding to the first source queue, and the first target counter is corresponding to the first target queue; when the first source marking unit is scheduled from the first source queue, decreasing the value of the first source counter by 1; and when the first target marking unit is scheduled from the first target queue, decreasing the value of the first target counter by 1. In this way, a case in which a scheduling queue cannot be correctly selected may be avoided when the source queue is a source queue of another queue or a target queue of another queue.

With reference to the third possible implementation of the first aspect, in a fourth possible implementation of the first aspect, before the scheduling the first target marking unit from the first target queue, the method further includes: determining that the value of the first source counter is less than the value of the first target counter. In this way, a case in which a scheduling queue cannot be correctly selected may be avoided when the source queue is a source queue of another queue or a target queue of another queue.

With reference to the third possible implementation of the first aspect or the fourth possible implementation of the first aspect, in a fifth possible implementation of the first aspect, the source marking unit carries first number information, the target marking unit carries the first number information and second number information, the first number information is a number of the source counter, and the second number information is a number of the target counter; and the method further includes: determining the source counter and the target counter based on the first number information and the second number information. When the first target marking unit is a first to-be-scheduled unit of the first target queue, a source counter and a target counter that are in a counter pair and that needs to be compared may be determined based on the first number information and the second number information.

With reference to the fourth possible implementation of the first aspect or the fifth possible implementation of the first aspect, in a sixth possible implementation of the first aspect, the method further includes: receiving $N_2$ data units from a second data flow, where $N_2$ is a positive integer greater than or equal to 1; inputting the $N_2$ data units into the first source queue; determining that the second data flow is switched from the first source queue to the first target queue; inputting a second source marking unit into the first source queue, and inputting a second target marking unit into the first target queue; receiving $M_2$ data units from the second data flow, where $M_1$ is a positive integer greater than or equal to 1; inputting the $M_2$ data units into the first target queue; scheduling the $N_2$ data units and the second source marking unit from the first source queue based on the second source marking unit and the second target marking unit, and scheduling the second target marking unit and the $M_2$ data units from the first target queue, where a moment at which the second source marking unit is scheduled from the first source queue is earlier than a moment at which the second target scheduling unit is scheduled from the first target queue; when the second source marking unit is input into the first source queue, increasing the value of the first source counter by 1; when the second target marking is input into the first target queue, increasing the value of the first target counter by 1; when the second source marking unit is scheduled from the first source queue, decreasing the value of the first source counter by 1; when the second target marking unit is scheduled from the first target queue, decreasing the value of the first target counter by 1; and before the scheduling the second target marking unit from the first target queue, the method further includes: determining that the value of the first source counter is less than the value of the first target counter.

With reference to the fourth possible implementation of the first aspect to the sixth possible implementation of the first aspect, in a seventh possible implementation of the first aspect, the method further includes: receiving $N_3$ data units from a third data flow, where $N_3$ is a positive integer greater than or equal to 1; inputting the $N_3$ data units into a second source queue; determining that the third data flow is switched from the second source queue to a second target queue, where the second source queue and the second target queue belong to a second queue pair, the second source queue is different from the first source queue, and/or the second target queue is different from the first target queue; inputting a third source marking unit into the second source queue, and inputting a third target marking unit into the second target queue; receiving $M_3$ data units from the third data flow, where $M_1$ is a positive integer greater than or equal to 1; inputting the $M_3$ data units into the second target queue; scheduling the $N_3$ data units and the third source marking unit from the second source queue based on the third source marking unit and the third target marking unit, and scheduling the third target marking unit and the $M_3$ data units from the second target queue, where a moment at which the third source marking unit is scheduled from the second source queue is earlier than a moment at which the second target scheduling unit is scheduled from the second target queue; when the third source marking unit is input into the second source queue, increasing a value of a second source counter in a second counter pair by 1; when the third target marking is input into the second target queue, increasing a value of a second target counter in the second counter pair by 1, where the second counter pair is corresponding to the second queue pair, the second source counter is corresponding to the second source queue, and the second target counter is corresponding to the second target queue; when the third source marking unit is scheduled from the second source queue, decreasing the value of the second source counter by 1; when the third target marking unit is scheduled from the second target queue, decreasing the value of the second target counter by 1; and before the scheduling the third target marking unit from the second target queue, the method further includes: determining that the value of the second source counter is less than the value of the second target counter.

According to a second aspect, an embodiment of this application further provides a switching device, where the switching device includes units configured to implement the first aspect or any possible implementation of the first aspect.

According to a third aspect, an embodiment of this application provides a switching device, where the switching device includes a memory, configured to store a program; a processor, configured to execute the program stored in the memory. When the program is executed, the processor is configured to perform the method according to the first aspect or any possible implementation of the first aspect. Optionally, the switching device is a chip or an integrated circuit.

According to a fourth aspect, an embodiment of this application provides a chip, configured to perform the method according to the first aspect or any possible implementation of the first aspect.

According to a fifth aspect, an embodiment of this application provides a computer readable storage medium. The computer readable storage medium stores an instruction, and when the instruction runs on a computer, the computer performs the methods in the foregoing aspects.

According to a sixth aspect, an embodiment of this application provides a computer program product including an instruction, and when the computer program product runs on a computer, the computer performs the methods in the foregoing aspects.

DESCRIPTION OF EMBODIMENTS

The following describes technical solutions of this application with reference to accompanying drawings.

A switching device in the embodiments of this application may be a switching device in a wide area network, or may be a switching device in a local area network. The switching device in the embodiments of this application may be a switch such as an Ethernet switch, a fiber channel switch, a fast Ethernet switch, or a Gigabit Ethernet switch. The switching device in the embodiments of this application may also be a router such as an access router, a backbone router, a wired router, or a wireless router. The switching device in the embodiments of this application may also be another network device that has a same function as a switch or a router.

A data unit in the embodiments of this application may be a data packet, or may be a descriptor of a data packet.

Figure 1:
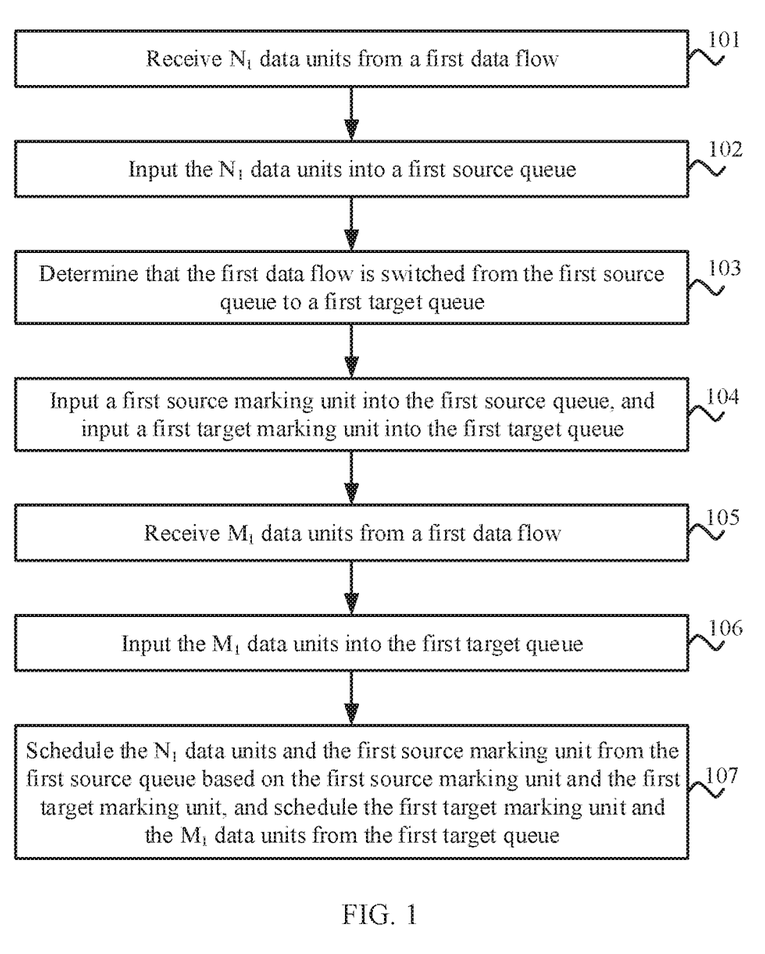
FIG. 1 is a schematic flowchart of a data scheduling method according to an embodiment of this application.

FIG. 1 is a schematic flowchart of a data scheduling method according to an embodiment of this application. The method shown in FIG. 1 may be performed by a switching device.

101. Receive $N_1$ data units from a first data flow, where the data unit is a data packet or a descriptor of a data packet, and $N_1$ is a positive integer greater than or equal to 1.

102. Input the $N_1$ data units into a first source queue.

103. Determine that the first data flow is switched from the first source queue to a first target queue, where the first source queue and the first target queue belong to a first queue pair.

104. Input a first source marking unit into the first source queue, and input a first target marking unit into the first target queue.

105. Receive $M_1$ data units from the first data flow, where $M_1$ is a positive integer greater than or equal to 1.

106. Input the $M_1$ data units into the first target queue.

107. Schedule the $N_1$ data units and the first source marking unit from the first source queue based on the first source marking unit and the first target marking unit, and schedule the first target marking unit and the $M_1$ data units from the first target queue, where a moment at which the first source marking unit is scheduled from the first source queue is earlier than a moment at which the first target scheduling unit is scheduled from the first target queue.

In the method shown in FIG. 1, an input sequence of the $N_1$ data units may be the same as an output sequence of the $M_1$ data units provided that a source marking unit and a target marking unit are respectively input into a source queue and a target queue. Therefore, in the foregoing technical solution, a data unit does not need to be switched from one queue to another queue. Consequently, complexity of queue management in this technical solution is relatively low. In addition, in this technical solution, there is no need to select some data units from one queue, and the switching device does not need to support random access. Therefore, this technical solution provides a simple and convenient method for avoiding data flow disorder.

The data unit in the first data flow first enters the first source queue, and then is switched from the first source queue to the first target queue. Therefore, in the method shown in FIG. 1, step 101 to step 107 are sequentially performed. In addition, a plurality of data units that belong to a same queue are scheduled from the queue in a first in first out manner.

The source marking unit (for example, the first source marking unit) and the target marking unit (for example, the first target marking unit) may be units in a special format and/or content. In other words, a format and/or content of a marking unit is different from a format and/or content of a data unit. Therefore, the switching device may determine, based on a format and/or content of the source marking unit and the target marking unit, whether a to-be-scheduled unit is the marking unit or the data unit.

Optionally, in some embodiments, the scheduling the $N_1$ data units and the first source marking unit from the first source queue based on the first source marking unit and the first target marking unit, and scheduling the first target marking unit and the $M_1$ data units from the first target queue includes: scheduling the $N_1$ data units and the first source marking unit from the first source queue based on the first source marking unit and the first target marking unit, and after the first source marking unit is scheduled from the first source queue, scheduling the first target marking unit and the $M_1$ data units from the first target queue.

Optionally, in some embodiments, the scheduling the $N_1$ data units and the first source marking unit from the first source queue based on the first source marking unit and the first target marking unit, and after the first source marking unit is scheduled from the first source queue, scheduling the first target marking unit and the $M_1$ data units from the first target queue includes: determining whether a first to-be-scheduled unit is the first source marking unit, where the first to-be-scheduled unit is a first to-be-scheduled unit in the source queue; determining whether a second to-be-scheduled unit is the first target marking unit, where the second to-be-scheduled unit is a first to-be-scheduled unit in the target queue; when the first to-be-scheduled unit is not the first source marking unit and the second to-be-scheduled unit is not the first target marking unit, scheduling the first to-be-scheduled unit and the second to-be-scheduled unit according to a preset rule, and continuing to determine whether a third to-be-scheduled unit is the first source marking unit, and determining whether a fourth to-be-scheduled unit is the first target marking unit, where the third to-be-scheduled unit is a first to-be-scheduled unit in the first source queue after the first to-be-scheduled unit is scheduled from the first source queue, and the fourth to-be-scheduled unit is a first to-be-scheduled unit in the first target queue after the second to-be-scheduled unit is scheduled from the first target queue; when the first to-be-scheduled unit is not the first source marking unit and the second to-be-scheduled unit is the first target marking unit, scheduling the first to-be-scheduled unit from the source queue, and continuing to determine whether the third to-be-scheduled unit is the first source marking unit; or when the first to-be-scheduled unit is the first source marking unit and the second to-be-scheduled unit is the first target marking unit, scheduling the first source marking unit from the first source queue, and after the first source marking unit is scheduled from the first source queue, scheduling the first target marking unit from the first target queue.

The preset scheduling rule may be a rule such as polling scheduling, weighted polling scheduling, or strict priority scheduling.

Optionally, in some embodiments, the scheduling device may further maintain a counter pair corresponding to the queue pair. For example, a first counter pair is corresponding to the first queue pair. The first counter pair includes a first source counter and a first target counter. The first source counter is corresponding to the first source queue, and the first target counter is corresponding to the first target queue. When the first source marking unit is input into the first source queue, a value of the first source counter is increased by 1; when the first target marking is input into the first target queue, a value of the first target counter is increased by 1; when the first source marking unit is scheduled from the first source queue, the value of the first source counter is decreased by 1; and when the first target marking unit is scheduled from the first target queue, the value of the first target counter is decreased by 1. In this way, a case in which a scheduling queue cannot be correctly selected may be avoided when the source queue is a source queue of another queue or a target queue of another queue.

Optionally, in some embodiments, before the scheduling the first target marking unit from the first target queue, the method further includes: determining that the value of the first source counter is less than the value of the first target counter. In other words, if the value of the first source counter is greater than or equal to the value of the first target counter before the second to-be-scheduled unit is scheduled from the target queue, the second to-be-scheduled unit is not scheduled from the first target queue. In this case, the to-be-scheduled unit in the first source queue may still be scheduled from the first source queue. In this way, a case in which a scheduling queue cannot be correctly selected may be avoided when the first source queue is a source queue of another queue pair or a target queue of another queue pair.

Optionally, in some embodiments, the source marking unit carries first number information, the target marking unit carries the first number information and second number information, the first number information is a number of the source counter, and the second number information is a number of the target counter; and the method further includes: determining the source counter and the target counter based on the first number information and the second number information.

Specifically, when the first source marking unit is input into the first source queue, the value of the first source counter in the first counter pair may be increased by 1 based on the first number information; when the first target marking unit is input into the first target queue, the value of the first target counter in the first counter pair may be increased by 1 based on the second number information; when the first source marking unit is scheduled from the first source queue, the value of the first source counter may be decreased by 1 based on the first number information; and when the first source marking unit is scheduled from the first target queue, the value of the first target counter may be decreased by 1 based on the second number information. When the first target marking unit is a first to-be-scheduled unit of the first target queue, the value of the first source counter and the value of the first target counter that are in the first counter pair and that needs to be compared may be determined based on the first number information and the second number information.

Optionally, in some embodiments, the method shown in FIG. 1 may further include: receiving $N_2$ data units from a second data flow, where $N_2$ is a positive integer greater than or equal to 1; inputting the $N_2$ data units into the first source queue; determining that the second data flow is switched from the first source queue to the first target queue; inputting a second source marking unit into the first source queue, and inputting a second target marking unit into the first target queue; receiving $M_2$ data units from the second data flow, where $M_1$ is a positive integer greater than or equal to 1;

inputting the $M_2$ data units into the first target queue; scheduling the $N_2$ data units and the second source marking unit from the first source queue based on the second source marking unit and the second target marking unit, and scheduling the second target marking unit and the $M_2$ data units from the first target queue, where a moment at which the second source marking unit is scheduled from the first source queue is earlier than a moment at which the second target scheduling unit is scheduled from the first target queue; when the second source marking unit is input into the first source queue, increasing the value of the first source counter by 1; when the second target marking is input into the first target queue, increasing the value of the first target counter by 1; when the second source marking unit is scheduled from the first source queue, decreasing the value of the first source counter by 1; when the second target marking unit is scheduled from the first target queue, decreasing the value of the first target counter by 1; and before the scheduling the second target marking unit from the first target queue, the method further includes: determining that the value of the first source counter is less than the value of the first target counter. A specific scheduling manner in which the switching device schedules the data unit in the second data flow is similar to a specific scheduling manner in which the switching device schedules the data unit in the first data flow. Details are not described herein again.

Optionally, in some embodiments, the method shown in FIG. 1 may further include: receiving $N_3$ data units from a third data flow, where $N_3$ is a positive integer greater than or equal to 1; inputting the N; data units into a second source queue; determining that the third data flow is switched from the second source queue to a second target queue, where the second source queue and the second target queue belong to a second queue pair, the second source queue is different from the first source queue, and/or the second target queue is different from the first target queue; inputting a third source marking unit into the second source queue, and inputting a third target marking unit into the second target queue; receiving $M_3$ data units from the third data flow, where $M_1$ is a positive integer greater than or equal to 1; inputting the $M_3$ data units into the second target queue; scheduling the $N_3$ data units and the third source marking unit from the second source queue based on the third source marking unit and the third target marking unit, and scheduling the third target marking unit and the $M_3$ data units from the second target queue, where a moment at which the third source marking unit is scheduled from the second source queue is earlier than a moment at which the second target scheduling unit is scheduled from the second target queue; when the third source marking unit is input into the second source queue, increasing a value of a second source counter in a second counter pair by 1; when the third target marking is input into the second target queue, increasing a value of a second target counter in the second counter pair by 1, where the second counter pair is corresponding to the second queue pair, the second source counter is corresponding to the second source queue, and the second target counter is corresponding to the second target queue; when the third source marking unit is scheduled from the second source queue, decreasing the value of the second source counter by 1; when the third target marking unit is scheduled from the second target queue, decreasing the value of the second target counter by 1; and before the scheduling the third target marking unit from the second target queue, the method further includes: determining that the value of the second source counter is less than the value of the second target counter. A specific scheduling manner in which the switching device schedules the data unit in the third data flow is similar to a specific scheduling manner in which the switching device schedules the data unit in the first data flow. Details are not described herein again. When the second source queue is the same as the first source queue, and the second target queue is different from the first target queue, or when the second source queue is different from the first source queue, and the second target queue is the same as the first target queue, a counter pair corresponding to the first queue pair is different from a counter pair corresponding to the second queue pair. Therefore, a case in which a scheduling queue cannot be correctly selected when the first source queue is a source queue in another queue pair or a target queue in another queue pair can be avoided by comparing a value of a source counter with a value of a target counter in a counter pair.

Figure 2:
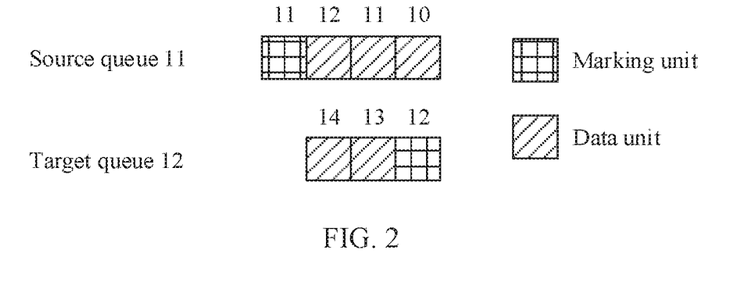
FIG. 2 is a schematic diagram of a data scheduling method according to an embodiment of this application.

FIG. 2 is a schematic diagram of a data scheduling method according to an embodiment of this application. A queue pair 1 shown in FIG. 2 includes two queues: a source queue 11 and a target queue 12. A data flow 1 is first input into the source queue 11. As shown in FIG. 2, data units that are input into the source queue 11 include a data unit 10 to a data unit 12 in the data flow 1. When the data flow 1 is switched from the source queue 11 to the target queue 12, a marking unit 11 is input into the source queue 11, and a marking unit 12 is input into the target queue 12. Then the obtained data units of the data flow 1 are input into the target queue 12. As shown in FIG. 2, data units that are input into the target queue 12 include a data unit 13 and a data unit 14 in the data flow 1.

As shown in FIG. 2, the source queue 11 includes a total of four units: the data unit 10, the data unit 11, the data unit 12, and the marking unit 11, and a first to-be-scheduled unit at the head of the source queue 11 is the data unit 10. The target queue 12 includes a total of three units: the marking unit 12, the data unit 13, and the data unit 14, and a first to-be-scheduled unit at the head of the target queue 12 is the marking unit 12. In addition, a sequence of data units that are in the data flow 1 and that are input into the queue pair 1 is: the data unit 10, the data unit 11, the data unit 12, the data unit 13, and the data unit 14.

A switching device may determine whether the first to-be-scheduled unit in the source queue 11 is a marking unit, and determines whether the first to-be-scheduled unit in the target queue 12 is a marking unit. As shown in FIG. 2, the switching device determines that the first to-be-scheduled unit in the source queue 11 is not a marking unit, and determines that the first to-be-scheduled unit in the target queue 12 is a marking unit. In this case, the switching device may schedule the first to-be-scheduled unit in the source queue 11 from the source queue 11, namely, the data unit 10 is scheduled from the source queue 11. In addition, the switching device does not schedule the first to-be-scheduled unit in the target queue 12, namely, the marking unit 12. After scheduling the data unit 10 from the source queue 11, the switching device determines whether a next to-be-scheduled unit in the source queue 11 is a marking unit. As shown in FIG. 2, the to-be-scheduled unit following the data unit 10 is the data unit 11. In this case, the switching device may continue to schedule the data unit 11 from the source queue 11. After the data unit 11 is scheduled from the source queue 11, the switching device may continue to determine whether a next to-be-scheduled unit in the queue 11 is a marking unit. As shown in FIG. 2, the to-be-scheduled unit following the data unit 11 is the data unit 12. In this case, the switching device may continue to schedule the data unit 12 from the source queue 11. After the data unit 12 is scheduled from the source queue 11, the switching device may continue to determine whether a next to-be-scheduled unit in the source queue 11 is a marking unit. As shown in FIG. 2, the to-be-scheduled unit following the data unit 12 is the marking unit 11. In this case, the switching device may schedule the marking unit 11 from the source queue 11. After the marking unit 11 is scheduled from the source queue 11, the switching device may schedule the marking unit 12 that is at the head of the target queue 12 from the target queue 12. As a result, the first to-be-scheduled unit in the target queue 12 is the data unit 13.

Optionally, in an embodiment, the switching device may stop scheduling a data unit from the source queue 11. After scheduling the marking unit 12 from the target queue 12, the switching device determines whether a next to-be-scheduled unit in the target queue 12 is a marking unit. As shown in FIG. 2, the to-be-scheduled unit following the marking unit 12 is the data unit 13. In this case, the switching device may continue to schedule the data unit 13 from the target queue 12. After scheduling the data unit 13 from the target queue 12, the switching device continues to determine whether a next to-be-scheduled unit in the target queue 12 is a marking unit. As shown in FIG. 2, the to-be-scheduled unit following the data unit 13 is the data unit 14. In this case, the switching device may schedule the data unit 14 from the target queue 12.

It may be understood that before determining whether a to-be-scheduled unit is a marking unit, the switching device may first determine whether the to-be-scheduled unit still exists, if the to-be-scheduled unit does not exist, schedules a unit in another queue from the queue, or if the to-be-scheduled unit exists, determines whether the to-be-scheduled unit is a marking unit. For example, after scheduling the data unit 14 from the target queue 12, the switching device determines whether there is a to-be-scheduled unit in the target queue 12. When there is no to-be-scheduled unit in the target queue 12 and there is a to-be-scheduled unit in the source queue 11, the to-be-scheduled unit in the source queue 11 may be scheduled from the source queue 11.

In the foregoing process, a sequence of data units scheduled from the source queue 11 and the target queue 12 is: the data unit 10, the data unit 11, the data unit 12, the data unit 13, and the data unit 14. It can be learned that a sequence of inputting the data units into the switching device is the same as a sequence of outputting the data units from the switching device.

In the embodiment shown in FIG. 2, only one data flow is input into the switching device. In some embodiments, in addition to the data flow 1, the switching device may further receive a data flow 2.

Optionally, in some embodiments, the data flow 2 is always input into the source queue 11. In this case, a sequence of inputting the data units into the switching device is the same as a sequence of outputting the data units from the switching device.

For example, a data unit 20 and a data unit 21 (not shown in FIG. 2) in the data flow 2 are respectively input into the source queue 11 after the data unit 10 and before the data unit 11. In this case, according to the foregoing rule, data units that are output from the queue pair 1 are successively the data unit 10, the data unit 20, the data unit 21, the data unit 11, the data unit 12, the data unit 13, and the data unit 14.

For another example, a data unit 22 and a data unit 23 (not shown in FIG. 2) in the data flow 2 are input into the source queue 11 after the data flow 1 is switched from the source queue 11 to the target queue 12.

Optionally, in some embodiments, the data unit 22 and the data unit 23 may be scheduled from the source queue 11 after the data unit 13 and the data unit 14 in the target queue 12 are scheduled from the target queue. In this way, according to the foregoing rule, data units that are output from the source queue 11 and the target queue 12 are successively: the data unit 10, the data unit 20, the data unit 21, the data unit 11, the data unit 12, the data unit 13, the data unit 14, the data unit 22, and the data unit 23. It can be learned that a sequence of inputting the data units of the data flow 1 into the switching device is the same as a sequence of outputting the data units of the data flow 1 from the switching device, and a sequence of inputting the data units of the data flow 2 into the switching device is the same as a sequence of outputting the data units of the data flow 2 from the switching device.

Optionally, in other embodiments, after the marking unit 11 is scheduled from the source queue 11, the switching device may schedule the marking unit 12 from the target queue 12. After this, the switching device may continue to determine whether a next to-be-scheduled unit in the source queue 11 is a marking unit, and determine whether a next to-be-scheduled unit in the target queue 12 is a marking unit. In this case, the next to-be-scheduled unit in the source queue 11 is the data unit 22, and the next to-be-scheduled unit in the target queue 12 is the data unit 13. In other words, neither the next to-be-scheduled unit in the source queue 11 nor the next to-be-scheduled unit in the target queue is a marking unit. In this case, the switching device may schedule the data unit 22 and the data unit 13 according to a preset rule. For example, if the preset rule is polling scheduling, and the source queue 11 is scheduled before the target queue 12 is scheduled, the switching device may first schedule the data unit 22 from the source queue 11, and then schedule the data unit 13 from the target queue 12. Similarly, a to-be-scheduled unit following the data unit 22 is the data unit 23, and a to-be-scheduled unit following the data unit 13 is the data unit 14. The switching device may schedule the data unit 23 from the source queue 11 in a same manner, and then schedule the data unit 14 from the target queue 12. In this way, according to the foregoing rule, data units that are output from the source queue 11 and the target queue 12 are successively: the data unit 10, the data unit 20, the data unit 21, the data unit 11, the data unit 12, the data unit 22, the data unit 13, the data unit 23, and the data unit 14. It can be learned that a sequence of inputting the data units of the data flow 1 into the switching device is the same as a sequence of outputting the data units of the data flow 1 from the switching device, and a sequence of inputting the data units of the data flow 2 into the switching device is the same as a sequence of outputting the data units of the data flow 2 from the switching device.

Optionally, in other embodiments, after the marking unit 11 is scheduled from the source queue 11, the switching device may continue to determine whether a next to-be-scheduled unit in the source queue 11 is a marking unit. The next to-be-scheduled unit in the source queue 11 is the data unit 22, and the next to-be-scheduled unit in the target queue 12 is the marking unit 12. Therefore, the switching device may continue to schedule the data unit 22 in the source queue 11 from the source queue 11. A next to-be-scheduled unit following the data unit 22 in the source queue 11 is the data unit 23. Therefore, the switching device may continue to schedule the data unit 23 from the source queue 11. There is no to-be-scheduled unit following the data unit 23 in the source queue 11. In this case, a unit in the target queue 12 may be scheduled from the queue. In this way, according to the foregoing rule, data units that are output from the source queue 11 and the target queue 12 are successively: the data unit 10, the data unit 20, the data unit 21, the data unit 11, the data unit 12, the data unit 22, the data unit 23, the data unit 13, and the data unit 14. It can be learned that a sequence of inputting the data units of the data flow 1 into the switching device is the same as a sequence of outputting the data units of the data flow 1 from the switching device, and a sequence of inputting the data units of the data flow 2 into the switching device is the same as a sequence of outputting the data units of the data flow 2 from the switching device.

Optionally, in some embodiments, a counter pair may be further set. The counter pair includes a source counter 11 and a target counter 12. The source counter 11 is corresponding to the source queue 11, and the target counter 12 is corresponding to the target queue 12. After one marking unit is input into a queue, the switching device may increase a value of a counter corresponding to the queue by 1. For example, when the marking unit 11 is input into the queue 11, a value of the source counter 11 is increased by 1; and when the marking unit 12 is input into the queue 12, a value of the target counter 12 is increased by 1. The switching device may further decrease the value of the source counter 11 by 1 after the marking unit 11 is scheduled from the source queue 11, and decrease the value of the target counter 12 by 1 after the marking unit 12 is scheduled from the target queue 12.

Further, before scheduling a marking unit in a target queue from the target queue, the switching device needs to determine that a value of a target counter is greater than a value of a source counter. Specifically, before scheduling the marking unit 12 from the target queue 12, the switching device needs to determine that the value of the target counter 12 is greater than the value of the source counter 11.

Further, the marking unit 11 may include number information 11, where the number information 11 is a number of the source counter 11. Similarly, the marking unit 12 may include number information 12, where the number information 12 is a number of the target counter 12. Optionally, in some embodiments, the marking unit 12 may further carry the number information 11. In this way, when the marking unit 12 is a first to-be-scheduled unit in the target queue 12, a source counter and a target counter in a counter pair that need to be compared may be determined based on the number information 11 and the number information 12.

The switching device may perform an increase/decrease operation on a value of a corresponding source counter and a value of a corresponding target counter based on number information in a marking unit.

Optionally, in other embodiments, the data flow 2 may also be switched from the source queue 11 to the target queue 12. In this case, the switching device may schedule obtained data units of the data flow 2 by using a solution the same as that of processing the data flow 1, for details, refer to FIG. 3.

Figure 3:
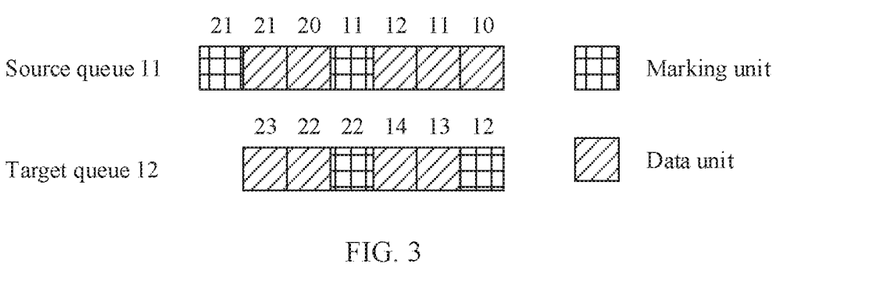
FIG. 3 is a schematic diagram of a data scheduling method according to an embodiment of this application.

FIG. 3 is a schematic diagram of a data scheduling method according to an embodiment of this application. A queue pair 1 shown in FIG. 3 includes two queues: a source queue 11 and a target queue 12. A data flow 1 is first input into the source queue 11. As shown in FIG. 3, data units that are input into the source queue 11 include a data unit 10 to a data unit 12 in the data flow 1. When the data flow 1 is switched from the source queue 11 to the target queue 12, a marking unit 11 is input into the source queue 11, and a marking unit 12 is input into the target queue 12. Then the obtained data units of the data flow 1 are input into the target queue 12. As shown in FIG. 3, data units that are input into the target queue 12 include a data unit 13 and a data unit 14 in the data flow 1. After the data unit 14 is input into the target queue 12, the switching device receives a data flow 2. The data flow 2 is first input into the source queue 11. As shown in FIG. 3, data units that are input into the source queue 11 include a data unit 20 and a data unit 21. When the data flow 2 is switched from the source queue 11 to the target queue 12, a marking unit 21 is input into the source queue 11, and a marking unit 22 is input into the target queue 12. Then the obtained data units of the data flow 2 are input into the target queue 12. As shown in FIG. 3, data units that are input into the target queue 12 include a data unit 22 and a data unit 23 in the data flow 2.

A manner in which the switching device processes the data unit 10 to the data unit 12 in the source queue 11 and the target queue 12 and the marking unit 11 is the same as that in the embodiment shown in FIG. 2. Details are not described herein again.

Provided that a moment at which a marking unit of a data flow is input into a source queue is earlier than a moment at which a marking unit of the data flow is input into a target queue, an input sequence of data units in the data flow may be the same as an output sequence of data units in the data flow. FIG. 3 is used as an example. An input sequence and an output sequence of data units in the data flow 1 cannot be changed provided that a moment at which the marking unit 11 is scheduled from the source queue 11 is earlier than a moment at which the marking unit 12 is scheduled from the target queue 12. Similarly, an input sequence and an output sequence of data units in the data flow 2 cannot be changed provided that a moment at which the marking unit 21 is scheduled from the source queue 11 is earlier than a moment at which the marking unit 22 is scheduled from the target queue 12.

Therefore, in some embodiments, after the marking unit 11 is scheduled from the source queue 11, the switching device may continue to schedule units from the source queue 11, and the marking unit 12, the data unit 13, the data unit 14, the marking unit 22, the data unit 22, and the data unit 23 in the target queue 12 are sequentially scheduled from the target queue 12 after the marking unit 21 is scheduled from the source queue 11.

In other embodiments, after the marking unit 11 is scheduled from the source queue 11, the marking unit 12 may be scheduled from the target queue 12. Then the data unit 20, the data unit 13, the data unit 21, and the data unit 14 may be sequentially scheduled from corresponding queues in a polling scheduling manner. After this, the marking unit 21, the marking unit 22, the data unit 22, and the data unit 23 are sequentially scheduled from corresponding queues.

In other embodiments, after the marking unit 11 is scheduled from the source queue 11, the marking unit 12 may be scheduled from the target queue 12. Then the data unit 13 and the data unit 14 may be sequentially scheduled from the target queue 12. After the data unit 14 is scheduled from the target queue 12, the data unit 20, the data unit 21, and the marking unit 21 may be sequentially scheduled from the source queue 11. After the marking unit 21 is scheduled from the source queue 11, the marking unit 22, the data unit 22, and the data unit 23 may be sequentially scheduled from the target queue 12.

In any one of the foregoing embodiments, an input sequence and an output sequence of data units in the data flow 1 do not change, and an input sequence and an output sequence of data units in the data flow 2 do not change.

Optionally, in some embodiments, a counter pair may be further set. The counter pair includes a source counter 11 and a target counter 12. The source counter 11 is corresponding to the source queue 11, and the target counter 12 is corresponding to the target queue 12. After one marking unit is input into a queue, the switching device may increase a value of a counter corresponding to the queue by 1. For example, after the marking unit 11 is input into the queue 11, a value of the source counter 11 is increased by 1; after the marking unit 12 is input into the queue 12, a value of the target counter 12 is increased by 1; after the marking unit 21 is input into the source queue 11, the value of the source counter 11 is increased by 1; and after the marking unit 22 is input into the target queue 12, the value of the target counter 12 is increased by 1. The switching device may further decrease the value of the source counter 11 by 1 after the marking unit 11 is scheduled from the queue 11; decrease the value of the target counter 12 by 1 after the marking unit 12 is scheduled from the target queue 12; decrease the value of the source counter 11 by 1 after the marking unit 21 is scheduled from the source queue 11; and decrease the value of the target counter 12 by 1 after the marking unit 22 is scheduled from the target queue 12.

Further, before scheduling a marking unit in a target queue from the target queue, the switching device needs to determine that a value of a target counter is greater than a value of a source counter. Specifically, before scheduling the marking unit 12 from the target queue 12, the switching device needs to determine that the value of the target counter 12 is greater than the value of the source counter 11; and before scheduling the marking unit 22 from the target queue 12, the switching device needs to determine that the value of the target counter 12 is greater than the value of the source counter 11.

Further, the marking unit 11 and the marking unit 21 may include number information 11, where the number information 11 is a number of the source counter 11. Similarly, the marking unit 12 and the marking unit 22 may include number information 12, where the number information 12 is a number of the target counter 12. Optionally, in some embodiments, the marking unit 12 may further carry the number information 11. In this way, when the marking unit 12 is a first to-be-scheduled unit in the target queue 12, a source counter and a target counter in a counter pair that need to be compared may be determined based on the number information 11 and the number information 12.

The switching device may perform an increase/decrease operation on a value of a corresponding source counter and a value of a corresponding target counter based on number information in a marking unit.

Optionally, in some embodiments, queues included in a queue pair corresponding to two different data flows may be the same, but a first-in queue is different from a switched queue. For example, a queue into which the data flow 1 is first input and a queue into which the data flow 2 is input after being switched from a queue belong to a same queue; and a queue into which the data flow 2 is first input and a queue into which the data flow 1 is input after being switched from a queue belong to a same queue. In this case, it may be considered that the data flow 1 is corresponding to the queue pair 1, and the queue pair 1 includes the source queue 11 and the target queue 12; and it is considered that the data flow 2 is corresponding to a queue pair 2, and the queue pair 2 includes a source queue 21 and the target queue 12. The source queue 21 and the target queue 12 belong to a same queue, and the target queue 12 and the source queue 11 belong to a same queue. In this case, a counter pair 1 corresponding to the queue pair 1 and a counter pair 2 corresponding to the queue pair 2 may be set. The switching device may schedule units in the source queue and the target queue by using values of counters in a counter pair and a marking unit. For a specific implementation, refer to an embodiment shown in FIG. 4.

Figure 4:
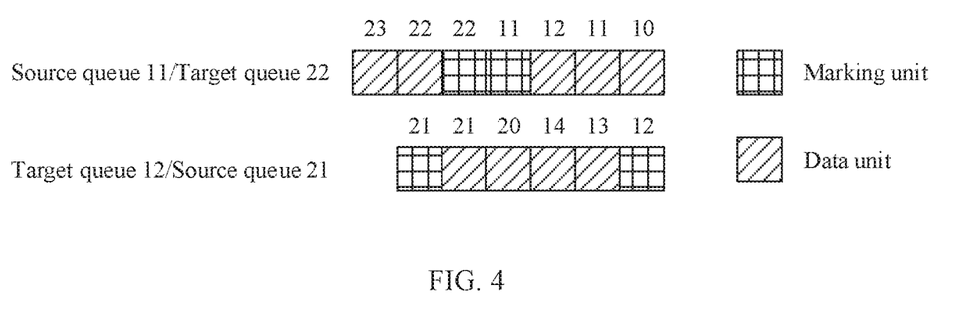
FIG. 4 is a schematic diagram of a data scheduling method according to an embodiment of this application.

FIG. 4 is a schematic diagram of a data scheduling method according to an embodiment of this application. A queue pair 1 shown in FIG. 4 includes two queues: a source queue 11 and a target queue 12. A data flow 1 is first input into the source queue 11. As shown in FIG. 4, data units that are input into the source queue 11 include a data unit 10 to a data unit 12 in the data flow 1. When the data flow 1 is switched from the source queue 11 to the target queue 12, a marking unit 11 is input into the source queue 11, and a marking unit 12 is input into the target queue 12. Then the obtained data units of the data flow 1 are input into the target queue 12. As shown in FIG. 4, data units that are input into the target queue 12 include a data unit 13 and a data unit 14 in the data flow 1. After the data unit 14 is input into the target queue 12, the switching device receives a data flow 2. The data flow 2 is corresponding to a queue pair 2. The queue pair 2 includes a source queue 21 and a target queue 22. The source queue 21 and the target queue 12 belong to a same queue, and the target queue 12 and the source queue 11 belong to a same queue. The data flow 2 is first input into the source queue 21. As shown in FIG. 4, data units that are input into the source queue 21 include a data unit 20 and a data unit 21. When the data flow 2 is switched from the source queue 21 to the target queue 22, a marking unit 21 is input into the source queue 21, and a marking unit 22 is input into the target queue 22. Then the obtained data units of the data flow 2 are input into the target queue 22. As shown in FIG. 4, data units that are input into the target queue 22 include a data unit 22 and a data unit 23 in the data flow 2.

A counter pair 1 includes a source counter 11 and a target counter 12, the source counter 11 is corresponding to the source queue 11, and the target counter 12 is corresponding to the target queue 12. A counter pair 2 includes a source counter 21 and a target counter 22, the source counter 21 is corresponding to the source queue 21, and the target counter 22 is corresponding to the target queue 22.

When the marking unit 11 is input into the source queue 11, a value of the source counter 11 may be increased by 1; and when the marking unit 12 is input into the target queue 12, a value of the target counter 12 may be increased by 1. When the marking unit 21 is input into the source queue 21, a value of the source counter 21 may be increased by 1; and when the marking unit 22 is input into the target queue 22, a value of the target counter 12 may be increased by 1. Initial values of two counters in each counter pair are the same. In other words, an initial value of the source counter 11 is the same as an initial value of the target counter 12, and an initial value of the source counter 21 is the same as an initial value of the target counter 22. It is assumed that initial values of the source counter 11, the target counter 12, the source counter 21, and the target counter 22 are 0, and in the case shown in FIG. 4, values of the source counter 11, the target counter 12, the source counter 21, and the target counter 22 are 1.

The marking unit 11 may include number information 11, where the number information 1 is a number of the source counter 1. Similarly, the marking unit 12 may include number information 12, where the number information 12 is a number of the target counter 12; the marking unit 21 may include number information 21, where the number information 21 is a number of the source counter 21, and the marking unit 22 may include number information 22, where the number information 22 is a number of the target counter 22.

The marking unit 12 may further carry the number information 11, and the marking unit 22 may further carry the number information 21. In this way, when the marking unit 12 is a first to-be-scheduled unit in the target queue 12, a source counter and a target counter in a counter pair that need to be compared may be determined based on number information carried in the marking unit 12/the marking unit 22.

The switching device may perform an increase/decrease operation on a value of a corresponding source counter and a value of a corresponding target counter based on number information in a marking unit.

A manner of scheduling a data unit that belongs to a plurality of data flows by the switching device is similar to a manner of scheduling a data unit that belongs to one data flow. In other words, it may be considered that the switching device may schedule a data unit that belongs to different data flows in a same manner.

The source queue 11, the target queue 12, the source queue 12, and the target queue 22 shown in FIG. 4 are used as an example. The switching device determines that a to-be-scheduled unit at the head of the source queue 11 is a data unit, and a to-be-scheduled unit at the head of the target queue 12 is a marking unit. In this case, the switching device may schedule the first to-be-scheduled unit in the source queue 11 from the source queue 11, namely, the data unit 10 is scheduled from the source queue 11. After scheduling the data unit 10 from the source queue 11, the switching device determines whether a next to-be-scheduled unit in the source queue 11 is a marking unit. As shown in FIG. 4, the to-be-scheduled unit following the data unit 10 is the data unit 11. In this case, the switching device may continue to schedule the data unit 11 from the source queue 11. After the data unit 11 is scheduled from the source queue 11, the switching device may continue to determine whether a next to-be-scheduled unit in the source queue 11 is a marking unit. As shown in FIG. 4, the to-be-scheduled unit following the data unit 11 is the data unit 12. In this case, the switching device may continue to schedule the data unit 12 from the source queue 11. After scheduling the data unit 12 from the source queue 11, the switching device determines whether a next to-be-scheduled unit in the source queue 11 is a marking unit. As shown in FIG. 4, the to-be-scheduled unit following the data unit 12 is the marking unit 11. In this case, the switching device may schedule the marking unit 11 from the source queue 11, and decrease the value of the source counter 11 by 1. As a result, the value of the source counter 11 is less than the value of the target counter 12. After scheduling the marking unit 11 from the source queue 11, the switching device may determine that the next to-be-scheduled unit in the source queue 11 is the marking unit 22. In addition, the switching device may determine, based on counter number information carried in the marking unit 22, that the value of the source counter 21 is equal to a value of the target counter 22. Therefore, after the marking unit 11 is scheduled from the source queue 11, the value of the target counter 12 is greater than the value of the source counter 11, and the value of the source counter 21 is equal to the value of the target counter 22. In this case, the switching device schedules the marking unit 12 at the head of the target queue 12 from the target queue 12. In addition, the switching device stops scheduling a data unit from the source queue 11. After scheduling the marking unit 12 from the target queue 12, the switching device decreases the value of the target counter 12 by 1. After scheduling the marking unit 12 from the target queue 12, the switching device determines whether a next to-be-scheduled unit in the target queue 12 is a marking unit. As shown in FIG. 4, the to-be-scheduled unit following the marking unit 12 is the data unit 13. In this case, the switching device may continue to schedule the data unit 13 from the target queue 12. After scheduling the data unit 13 from the target queue 12, the switching device continues to determine whether a next to-be-scheduled unit in the target queue 12 is a marking unit. As shown in FIG. 4, the to-be-scheduled unit following the data unit 13 is the data unit 14. In this case, the switching device may schedule the data unit 14 from the target queue 12.

After the data unit 14 is scheduled from the target queue 12, the to-be-scheduled unit at the head of the source queue 11 is the marking unit 22, and the to-be-scheduled unit at the head of the target queue 12 is the data unit 20.

The switching device may determine, based on the number information in the marking unit 22, that the value of the source counter 21 is equal to the value of the target counter 22. Therefore, the switching device can schedule the data unit 20 from the source queue 21. The switching device determines whether a next to-be-scheduled unit in the source queue 21 is a marking unit. As shown in FIG. 4, the to-be-scheduled unit following the data unit 20 is the data unit 21. In this case, the switching device may continue to schedule the data unit 21 from the source queue 21. After scheduling the data unit 21 from the source queue 21, the switching device continues to determine whether a next to-be-scheduled unit in the queue 21 is a marking unit. As shown in FIG. 4, the to-be-scheduled unit following the data unit 21 is the marking unit 21. In this case, the switching device may schedule the marking unit 21 from the source queue 21, and decrease the value of the source counter 21 by 1. As a result, the value of the source counter 21 is less than the value of the target counter 22. In this case, the switching device schedules the marking unit 22 at the head of the target queue 22 from the target queue 22. In addition, the switching device stops scheduling a data unit from the source queue 21. After scheduling the marking unit 22 from the target queue 22, the switching device decreases the value of the target counter 22 by 1. After scheduling the marking unit 22 from the target queue 12, the switching device determines whether a next to-be-scheduled unit in the target queue 22 is a marking unit. As shown in FIG. 4, the to-be-scheduled unit following the marking unit 22 is the data unit 22. In this case, the switching device may continue to schedule the data unit 22 from the target queue 22. After scheduling the data unit 22 from the target queue 22, the switching device continues to determine whether a next to-be-scheduled unit in the target queue 22 is a marking unit. As shown in FIG. 4, the to-be-scheduled unit following the data unit 22 is the data unit 23. In this case, the switching device may schedule the data unit 23 from the target queue 22.

In the foregoing process, a sequence of data units that are output from the source queue 11 and the target queue 12 is: the data unit 10, the data unit 11, the data unit 12, the data unit 13, the data unit 14, the data unit 20, the data unit 21, the data unit 22, and the data unit 23. It can be learned that a sequence of inputting the data units into the switching device is the same as a sequence of outputting the data units from the switching device.

In the embodiments shown in FIG. 2 to FIG. 4, each queue is a source queue or a target queue of one queue. In some embodiments, one queue may be a source queue or a target queue of a plurality of queues. In this case, a queue pair still includes two queues, namely, a source queue and a target queue.

For example, there are three queues: a queue A, a queue B, and a queue C. A data flow 1 is switched from the queue A to the queue B. In this case, for the data flow 1, the data flow 1 is corresponding to a queue pair AB, the queue A in the queue pair AB is a source queue of the data flow 1, and the queue B in the queue pair AB is a target queue of the data flow 1. A data flow 2 is switched from the queue A to the queue C. In this case, for the data flow 2, the data flow 2 is corresponding to a queue pair AC, the queue A in the queue pair AC is a source queue of the data flow 2, and the queue C in the queue pair AC is a target queue of the data flow 2.

For another example, there are three queues: a queue D, a queue E. and a queue F. A data flow 3 is switched from the queue D to the queue F. In this case, for the data flow 1, the data flow 1 is corresponding to a queue pair DF, the queue D in the queue pair DF is a source queue of the data flow 1, and the queue F in the queue pair DF is a target queue of the data flow 1. The data flow 2 is switched from the queue E to the queue F. In this case, for the data flow 2, the data flow 2 is corresponding to a queue pair EF, the queue E in the queue pair EF is a source queue of the data flow 2, and the queue F in the queue pair EF is a target queue of the data flow 2.

Figure 5:
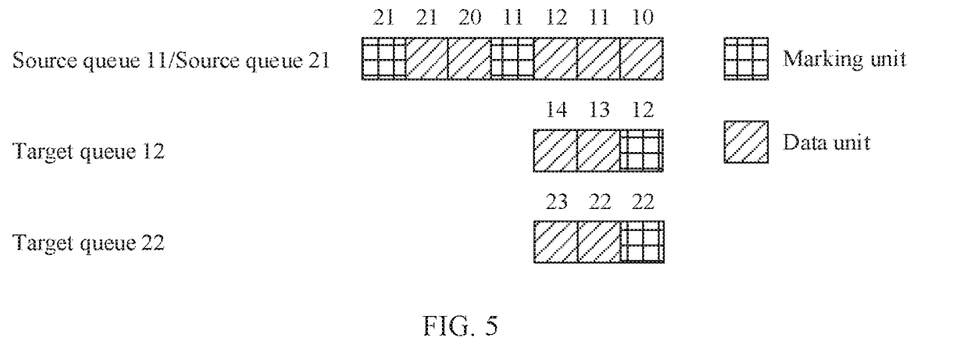
FIG. 5 is a schematic diagram of a data scheduling method according to an embodiment of this application.

The following describes, with reference to FIG. 5, a case in which one queue is a source queue of a plurality of queues.

FIG. 5 is a schematic diagram of a data scheduling method according to an embodiment of this application. A queue pair 1 shown in FIG. 5 includes two queues: a source queue 11 and a target queue 12. The data flow 1 is first input into the source queue 11. As shown in FIG. 5, data units that are input into the source queue 11 include a data unit 10 to a data unit 12 in the data flow 1. When the data flow 1 is switched from the source queue 11 to the target queue 12, a marking unit 11 is input into the source queue 11, and a marking unit 12 is input into the target queue 12. Then the obtained data units of the data flow 1 are input into the target queue 12. As shown in FIG. 5, data units that are input into the target queue 12 include a data unit 13 and a data unit 14 in the data flow 1. After the data unit 14 is input into the target queue 12, the switching device receives a data flow 2. The data flow 2 is corresponding to a queue pair 2. The queue pair 2 includes a source queue 21 and a target queue 22. The source queue 21 and the source queue 11 belong to a same queue. The target queue 22 and the target queue 12 belong to different queues. The data flow 2 is first input into the source queue 21. As shown in FIG. 5, data units that are input into the source queue 21 include a data unit 20 and a data unit 21. When the data flow 2 is switched from the source queue 21 to the target queue 22, a marking unit 21 is input into the source queue 21, and a marking unit 22 is input into the target queue 22. Then the obtained data units of the data flow 2 are input into the target queue 22. As shown in FIG. 5, data units that are input into the target queue 22 include a data unit 22 and a data unit 23 in the data flow 2.

When the marking unit 11 is input into the source queue 11, a value of the source counter 11 may be increased by 1; and when the marking unit 12 is input into the target queue 12, a value of the target counter 12 may be increased by 1. When the marking unit 21 is input into the source queue 21, a value of the source counter 21 may be increased by 1; and when the marking unit 22 is input into the target queue 22, a value of the target counter 12 may be increased by 1. Initial values of two counters in each counter pair are the same. In other words, an initial value of the source counter 11 is the same as an initial value of the target counter 12, and an initial value of the source counter 21 is the same as an initial value of the target counter 22. It is assumed that initial values of the source counter 11, the target counter 12, the source counter 21, and the target counter 22 are 0, and in the case shown in FIG. 5, values of the source counter 11, the target counter 12, the source counter 21, and the target counter 22 are 1.

The marking unit 11 may include number information 11, where the number information 11 is a number of the source counter 11. Similarly, the marking unit 12 may include number information 12, where the number information 12 is a number of the target counter 12; the marking unit 21 may include number information 21, where the number information 21 is a number of the source counter 21; and the marking unit 22 may include number information 22, where the number information 22 is a number of the target counter 22.

The marking unit 12 may further carry the number information 11, and the marking unit 22 may further carry the number information 21. In this way, when the marking unit 12 is a first to-be-scheduled unit in the target queue 12, a source counter and a target counter in a counter pair that need to be compared may be determined based on number information carried in the marking unit 12/the marking unit 22.

The switching device may perform an increase/decrease operation on a value of a corresponding source counter and a value of a corresponding target counter based on number information in a marking unit.

Optionally, in some embodiments, a specific process in which the switching device processes the data unit 10 to the data unit 14, the marking unit 11, and the marking unit 12 may be the same as a specific process in which the switching device processes the data unit 10 to the data unit 14, the marking unit 11, and the marking unit 12 in the embodiment shown in FIG. 4. Details are not described herein again.

After the data unit 14 is scheduled from the target queue 12, the to-be-scheduled unit at the head of the source queue 11 is the data unit 20, and the to-be-scheduled unit at the head of the target queue 12 is the marking unit 22.

The switching device may determine, based on number information in the marking unit 22, that a counter corresponding to the marking unit 22 is the target counter 22. In addition, the value of the source counter 21 is the same as the value of the target counter 22. In this case, the switching device may schedule the first to-be-scheduled unit in the source queue 21 from the source queue 21, namely, the data unit 20 is scheduled from the source queue 21. After scheduling the data unit 20 from the source queue 21, the switching device determines whether a next to-be-scheduled unit in the source queue 21 is a marking unit. As shown in FIG. 5, the to-be-scheduled unit following the data unit 20 is the data unit 21. In this case, the switching device may continue to schedule the data unit 21 from the source queue 21. After scheduling the data unit 21 from the source queue 21, the switching device continues to determine whether a next to-be-scheduled unit in the source queue 21 is a marking unit. As shown in FIG. 5, the to-be-scheduled unit following the data unit 21 is the marking unit 21. In this case, the switching device may schedule the marking unit 21 from the source queue 21, and decrease the value of the source counter 21 by 1. As a result, the value of the source counter 21 is less than the value of the target counter 22. In this case, the switching device schedules the marking unit 22 at the head of the target queue 22 from the target queue 22. In addition, the switching device stops scheduling a data unit from the source queue 21. After scheduling the marking unit 22 from the target queue 22, the switching device decreases the value of the target counter 22 by 1. After scheduling the marking unit 22 from the target queue 12, the switching device determines whether a next to-be-scheduled unit in the target queue 22 is a marking unit. As shown in FIG. 5, the to-be-scheduled unit following the marking unit 22 is the data unit 22. In this case, the switching device may continue to schedule the data unit 22 from the target queue 22. After scheduling the data unit 22 from the target queue 22, the switching device continues to determine whether a next to-be-scheduled unit in the target queue 22 is a marking unit. As shown in FIG. 5, the to-be-scheduled unit following the data unit 22 is the data unit 23. In this case, the switching device may schedule the data unit 23 from the target queue 22.

In the foregoing process, a sequence of data units that are output from the source queue 11 and the target queue 12 is: the data unit 10, the data unit 11, the data unit 12, the data unit 13, the data unit 15, the data unit 20, the data unit 21, the data unit 22, and the data unit 23. It may be learned that an input sequence and an output sequence of data units in the data flow 1 do not change, and an input sequence and an output sequence of data units in the data flow 2 do not change.

Optionally, in other embodiments, the switching device may first schedule all units in the source queue 11 from the source queue 11, namely, the data unit 10, the data unit 11, the data unit 12, the marking unit 11, the data unit 20, the data unit 21, and the marking unit 21 are scheduled from the source queue 11. Then the switching device schedules all units in the target queue 12 and the target queue 22 from corresponding queues. In this case, the input sequence and the output sequence of data units in the data flow 1 do not change, and the input sequence and the output sequence of data units in the data flow 2 do not change.

Optionally, in other embodiments, after scheduling the data unit 11 and the data unit 12 in the source queue 11 from the source queue 11, and scheduling the marking unit 11 from the source queue 11, the switching device may first schedule the marking unit 12 in the target queue 12 from the target queue 12. Then the switching device may schedule remaining data units in the source queue 21 and remaining data units in the target queue 12 according to a preset rule (for example, polling scheduling). After scheduling the marking unit 21 from the source queue 21, the switching device may sequentially schedule the marking unit 22, the data unit 22, and the data unit 23 from the target queue 22.

A person skilled in the art may understand that a case in which one queue is a target queue of a plurality of queues is similar to a case in which one queue is a source queue of a plurality of queues. Details are not described herein again.

Figure 6:
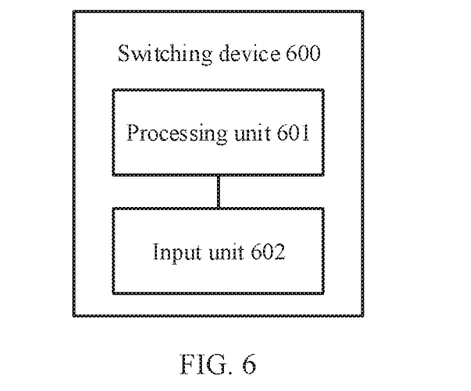
FIG. 6 is a structural block diagram of a switching device according to an embodiment of this application.

FIG. 6 is a structural block diagram of a switching device according to an embodiment of this application. As shown in FIG. 6, the switching device 600 includes a processing unit 601 and an input unit 602.

The input unit 602 is configured to receive $N_1$ data units from a first data flow, where the data unit is a data packet or a descriptor of a data packet, and $N_1$ is a positive integer greater than or equal to 1.

The input unit 602 is further configured to input the $N_1$ data units into a first source queue.

The processing unit 601 is configured to determine that the first data flow is switched from the first source queue to a first target queue, where the first source queue and the first target queue belong to a first queue pair.

The processing unit 601 is further configured to: generate a first source marking unit and a first target marking unit, input the first source marking unit into the first source queue, and input the first target marking unit into the first target queue.

The input unit 602 is further configured to receive $M_1$ data units from the first data flow, where $M_1$ is a positive integer greater than or equal to 1.

The input unit 602 is further configured to input the $M_1$ data units into the first target queue.

The processing unit 601 is further configured to: schedule the $N_1$ data units and the first source marking unit from the first source queue based on the first source marking unit and the first target marking unit, and schedule the first target marking unit and the $M_1$ data units from the first target queue, where a moment at which the first source marking unit is scheduled from the first source queue is earlier than a moment at which the first target scheduling unit is scheduled from the first target queue.

For specific functions and beneficial effects of the processing unit 601 and the input unit 602, refer to the embodiment shown in FIG. 1. Details are not described herein again.

The processing unit 601 may be implemented by a processor, and the input unit 602 may be implemented by receiving.

Figure 7:
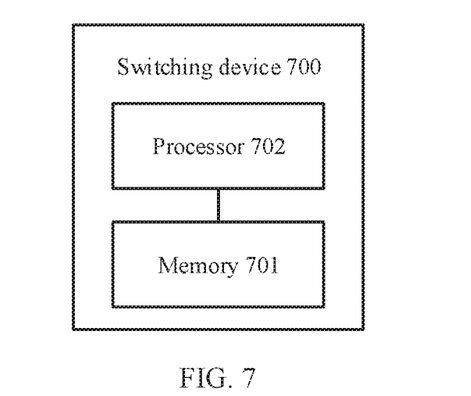
FIG. 7 is a structural block diagram of another switching device according to an embodiment of this application.

FIG. 7 is a structural block diagram of another switching device according to an embodiment of this application. As shown in FIG. 7, the switching device 700 includes a memory 701 and a processor 702.

The memory 701 is configured to store a program.

The processor 702 is configured to execute the program stored in the memory 701. When the program is executed, the switching device 700 may implement the method provided in the embodiment shown in FIG. 1.

By using the switching device 700, a part or all of the method shown in FIG. 1 may be implemented by using software.

The memory 701 may be a physically independent unit, or may be integrated into the processor 702.

Optionally, when a part or all of the method shown in FIG. 1 is implemented by using software, the switching device 700 may include only the processor 702. The memory 701 configured to store the programs is located outside an apparatus 700. The processor 702 is connected to the memory 701 by using a circuit/wire, and is configured to read and execute the program stored in the memory 701.

The processor 702 may be a central processing unit (central processing unit, CPU), a network processor (network processor, NP), or a combination of a CPU and an NP.

The processor 702 may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 701 may include a volatile memory (volatile memory), for example, a random-access memory (random-access memory, RAM); the memory 701 may also include a non-volatile memory (non-volatile memory), for example, a flash memory (flash memory), a hard disk drive (hard disk drive, HDD), or a solid-state drive (solid-state drive, SSD); or the memory 701 may further include a combination of the foregoing types of memories.

Another aspect of this application provides a computer readable storage medium. The computer readable storage medium stores an instruction. When the instruction runs on a computer, the computer performs the method shown in FIG. 1.

Still another aspect of this application provides a computer program product including an instruction. When the computer program product runs on a computer, the computer performs the method shown in FIG. 1.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data scheduling method comprising:
receiving a first data flow that includes a plurality of data units, wherein each of the plurality of data units is a data packet or a descriptor of a data packet, the first data flow is switched from a first source queue to a first target queue corresponding to the first source queue;
inputting $N_1$ data units of the plurality of data units and a first source marking unit into the first source queue;
inputting $M_1$ data units of the plurality of data units and a first target marking unit into the first target queue, wherein the $N_1$ data units and the $M_1$ data units are different data units;
scheduling the $N_1$ data units and the first source marking unit based on the first source marking unit and the first target marking unit; and
scheduling the first target marking unit and the $M_1$ data units, wherein the first target marking unit and the $M_1$ data units are scheduled later than the $N_1$ data units and the first source marking unit are scheduled.

2. The method according to claim 1, wherein the scheduling the first target marking unit and the $M_1$ data units is performed after the first source marking unit is scheduled.

3. The method according to claim 2, wherein the scheduling the $N_1$ data units and the first source marking unit and the scheduling the first target marking unit and the $M_1$ data units further comprises:
determining whether a first data unit in the first source queue is the first source marking unit;
determining whether a second data unit in the first target queue is the first target marking unit;
in response to determining that the first data unit is not the first source marking unit and the second data unit is not the first target marking unit:
scheduling the first data unit and the second data unit according to a preset rule;
determining whether a third data unit in the first source queue is the first source marking unit,
determining whether a fourth data unit in the first target queue is the first target marking unit;
in response to determining that the first data unit is not the first source marking unit and the second data unit is the first target marking unit, scheduling the first data unit from the first source queue, and determine whether the third data unit is the first source marking unit; and
in response to determining that the first data unit is the first source marking unit and the second data unit is the first target marking unit, scheduling the first source marking unit from the first source queue, and scheduling the first target marking unit after the first source marking unit is scheduled.

4. The method according to claim 2, wherein the method further comprises: in response to inputting the first source marking unit into the first source queue, increasing a value of a first source counter in a first counter pair by 1;

in response to input the first target marking unit into the first target queue, increasing a value of a first target counter in the first counter pair by 1, wherein the first counter pair corresponds to a first queue pair, the first source counter corresponds to the first source queue, and the first target counter corresponds to the first target queue;

after the first source marking unit is scheduled, decreasing the value of the first source counter by 1; and after the first target marking unit is scheduled, decreasing the value of the first target counter by 1.

5. The method according to claim 4, the method further comprises: before the scheduling the first target marking unit from the first target queue, determining that the value of the first source counter is less than the value of the first target counter.

6. The method according to claim 5, wherein the method further comprises:

receiving a second data flow that includes a plurality of data units;

inputting $N_2$ data units of the plurality of data units of the second data flow and a second source marking unit into the first source queue;

inputting $M_2$ data units of the plurality of data units of the second data flow and a second target marking unit into the first target queue, wherein the $N_2$ data units and the $M_2$ data units are different data units;

scheduling the $N_2$ data units and the second source marking unit based on the second source marking unit and the second target marking unit; and scheduling the second target marking unit and the $M_2$ data units, wherein the second target marking unit and the $M_2$ data units are scheduled later than the $N_2$ data units and the second source marking unit are scheduled; in response to inputting the second source marking unit into the first source queue, increasing the value of the first source counter by 1;

in response to inputting the second target marking unit into the first target queue, increasing the value of the first target counter by 1;

after the second source marking unit is scheduled from the first source queue, decreasing the value of the first source counter by 1;

after the second target marking unit is scheduled from the first target queue, decreasing the value of the first target counter by 1; and before the scheduling the second target marking unit from the first target queue, determining that the value of the first source counter is less than the value of the first target counter.

7. The method according to claim 5, wherein the method further comprises:

receiving a third data flow that includes a plurality of data units;

inputting $N_3$ data units of the plurality of data units of the third data flow and a third source marking unit into a second source queue;

inputting $M_3$ data units of the plurality of data units of the third data flow and a third target marking unit into a second target queue, wherein the $N_3$ data units and the $M_3$ data units are different data units;

scheduling the $N_3$ data units and the third source marking unit based on the third source marking unit and the third target marking unit; and scheduling the third target marking unit and the $M_3$ data units, wherein the third target marking unit and the $M_3$ data units are scheduled later than the $N_3$ data units and the third source marking unit are scheduled;

in response to inputting the third source marking unit into the second source queue, increasing the value of a second source counter by 1;

in response to inputting the third target marking unit into the second target queue, increasing the value of a second target counter by 1;

after the third source marking unit is scheduled from the second source queue, decreasing the value of the second source counter by 1;

after the third target marking unit is scheduled from the second target queue, decreasing the value of the second target counter by 1; and before the scheduling the third target marking unit from the second target queue, determining that the value of the second source counter is less than the value of the second target counter.

8. The method according to claim 4, wherein the first source marking unit carries first number information, the first target marking unit carries the first number information and second number information, the first number information is a number of the first source counter, and the second number information is a number of the first target counter; and the method further comprises: determining the first source counter and the first target counter based on the first number information and the second number information.

9. A switching device, wherein the switching device comprises:

a transceiver;

at least one processor; and a non-transitory computer-readable storage medium storing a program to be executed by the at least one processor, the program including instructions instructing the at least one processor to:

cause the transceiver to receive a first data flow that includes a plurality of data units, wherein each of the plurality of data units is a data packet or a descriptor of a data packet, the first data flow is switched from a first source queue to a first target queue corresponding to the first source queue;

input $N_1$ data units of the plurality of data units and a first source marking unit into the first source queue;

input $M_1$ data units of the plurality of data units and a first target marking unit into the first target queue, wherein the $N_1$ data units and the $M_1$ data units are different data units;

schedule the $N_1$ data units and the first source marking unit based on the first source marking unit and the first target marking unit; and scheduling the first target marking unit and the $M_1$ data units, wherein the first target marking unit and the $M_1$ data units are scheduled later than the $N_1$ data units and the first source marking unit are scheduled.

10. The switching device according to claim 9, wherein the program further includes instructions instructing the processor to:

schedule the first target marking unit and the $M_1$ data units is performed after the first source marking unit is scheduled.

11. The switching device according to claim 10, wherein the program further includes instructions instructing the processor to:

determine whether a first data unit in the first source queue is the first source marking unit;

determine whether a second data unit in the first target queue is the first target marking unit;

in response to determining that the first data unit is not the first source marking unit and the second data unit is not the first target marking unit:
schedule the first data unit and the second data unit according to a preset rule;
determine whether a third data unit in the first source queue is the first source marking unit,
determine whether a fourth data unit in the first target queue is the first target marking unit;

in response to determining that the first data unit is not the first source marking unit and the second data unit is the first target marking unit, schedule the first data unit from the first source queue, and determine whether the third data unit is the first source marking unit; and in response to determining that the first data unit is the first source marking unit and the second data unit is the first target marking unit, schedule the first source marking unit from the first source queue, and scheduling the first target marking unit after the first source marking unit is scheduled.

12. The switching device according to claim 10, wherein the program further includes instructions instructing the processor to:
in response to inputting the first source marking unit into the first source queue, increase a value of a first source counter in a first counter pair by 1;
in response to input the first target marking unit into the first target queue, increase a value of a first target counter in the first counter pair by 1, wherein the first counter pair corresponds to a first queue pair, the first source counter corresponds to the first source queue, and the first target counter corresponds to the first target queue;
after the first source marking unit is scheduled, decrease the value of the first source counter by 1; and
after the first target marking unit is scheduled, decrease the value of the first target counter by 1.

13. The switching device according to claim 12, wherein the program further includes instructions instructing the processor to: before the scheduling the first target marking unit from the first target queue, determining that the value of the first source counter is less than the value of the first target counter.

14. The switching device according to claim 13, wherein the program further includes instructions instructing the processor to:
cause the transceiver to receive a second data flow that includes a plurality of data units;
input $N_2$ data units of the plurality of data units of the second data flow and a second source marking unit into the first source queue;
input $M_2$ data units of the plurality of data units of the second data flow and a second target marking unit into the first target queue, wherein the $N_2$ data units and the $M_2$ data units are different data units;
schedule the $N_2$ data units and the second source marking unit based on the second source marking unit and the second target marking unit; and
schedule the second target marking unit and the $M_2$ data units, wherein the second target marking unit and the $M_2$ data units are scheduled later than the $N_2$ data units and the second source marking unit are scheduled; in response to inputting the second source marking unit into the first source queue, increase the value of the first source counter by 1;
in response to inputting the second target marking unit into the first target queue, increase the value of the first target counter by 1;
after the second source marking unit is scheduled from the first source queue, decrease the value of the first source counter by 1;
after the second target marking unit is scheduled from the first target queue, decrease the value of the first target counter by 1; and
before the scheduling the second target marking unit from the first target queue, determine that the value of the first source counter is less than the value of the first target counter.

15. The switching device according to claim 13, the program further includes instructions instructing the processor to:
receive a third data flow that includes a plurality of data units;
input $N_3$ data units of the plurality of data units of the third data flow and a third source marking unit into a second source queue;
input $M_3$ data units of the plurality of data units of the third data flow and a third target marking unit into a second target queue, wherein the $N_3$ data units and the $M_3$ data units are different data units;
schedule the $N_3$ data units and the third source marking unit based on the third source marking unit and the third target marking unit; and
schedule the third target marking unit and the $M_3$ data units, wherein the third target marking unit and the $M_3$ data units are scheduled later than the $N_3$ data units and the third source marking unit are scheduled;
in response to inputting the third source marking unit into the second source queue, increase the value of a second source counter by 1;
in response to inputting the third target marking unit into the second target queue, increase the value of a second target counter by 1;
after the third source marking unit is scheduled from the second source queue, decrease the value of the second source counter by 1;
after the third target marking unit is scheduled from the second target queue, decrease the value of the second target counter by 1; and
before the scheduling the third target marking unit from the second target queue, determine that the value of the second source counter is less than the value of the second target counter.

16. The switching device according to claim 12, wherein the source marking unit carries first number information, the target marking unit carries the first number information and second number information, the first number information is a number of the first source counter, and the second number information is a number of the first target counter; and
the program further includes instructions instructing the processor to:
determine the first source counter and the first target counter based on the first number information and the second number information.

17. A switching device comprising:
at least one processor and a non-transitory computer-readable storage medium coupled to the at least one processor and storing programming instructions for execution by the at least one processor, the programming instructions instruct the at least one processor to:
receive a first data flow that includes a plurality of data units, wherein each of the plurality of data units is a data packet or a descriptor of a data packet, the first data flow is switched from a first source queue to a first target queue corresponding to the first source queue;

input $N_1$ data units of the plurality of data units and a first source marking unit into the first source queue;

input $M_1$ data units of the plurality of data units and a first target marking unit into the first target queue, wherein the $N_1$ data units and the $M_1$ data units are different data units;

schedule the $N_1$ data units and the first source marking unit based on the first source marking unit and the first target marking unit; and schedule the first target marking unit and the $M_1$ data units, wherein the first target marking unit and the $M_1$ data units are scheduled later than the $N_1$ data units and the first source marking unit are scheduled.

* * * * *